United States Patent [19]

Inoue

[11] Patent Number: 5,274,812
[45] Date of Patent: Dec. 28, 1993

[54] METHOD OF COMPILING SOURCE CODE INTO VECTORIZED OBJECT CODE BY PERFORMING A ONE-DIMENSIONAL ANALYSIS ON EACH DIMENSION OF A MULTI-DIMENSIONAL ARRAY WITHIN A LOOP

[75] Inventor: Atsushi Inoue, Yokohama, Japan

[73] Assignee: Kabushiki Kaisha Toshiba, Kawasaki, Japan

[21] Appl. No.: 556,441

[22] Filed: Jul. 24, 1990

[30] Foreign Application Priority Data

Sep. 27, 1989 [JP] Japan .................. 1-249072

[51] Int. Cl.$^5$ .............................................. G06F 9/00
[52] U.S. Cl. ............................ 395/700; 364/DIG. 1; 364/280.4; 364/280.5; 364/232.21
[58] Field of Search ..................... 395/700; 364/191

[56] References Cited

U.S. PATENT DOCUMENTS

| | | | |
|---|---|---|---|
| 4,773,007 | 9/1988 | Kanada et al. | 395/700 |
| 4,807,126 | 2/1989 | Gotou et al. | 395/700 |
| 4,821,181 | 4/1989 | Iwasawa et al. | 364/200 |
| 4,833,606 | 5/1989 | Iwasawa et al. | 364/200 |
| 5,088,034 | 2/1992 | Ihara et al. | 395/700 |
| 5,093,916 | 3/1992 | Karp et al. | 395/700 |
| 5,142,681 | 8/1992 | Driscoll et al. | 395/700 |
| 5,151,991 | 9/1992 | Iwasawa et al. | 395/700 |

OTHER PUBLICATIONS

IEEE Transactions on Computers, pp. 660–670, Sep. 1979 vol. C-28, No. 9, Uptal Banerjee et al. "Time and Parallel Processor Bounds for Fortran-Like Loops".

Int. Conf. On Supercomputing, pp. 418–428, Jul. 4–8, 1988, D. R. Wallace, "Dependence of Multi-Dimensional Array References".

Proc. Of The 1986 IBM Europe Institute Seminar on Parallel Computing, pp. 15–28, Aug. 11–15, 1986, R. Cytron, "On The Application of Dependence Analysis and Restructuring Techniques to Parallel and Functional Languages".

Primary Examiner—Thomas C. Lee
Assistant Examiner—Mehmet Geckil
Attorney, Agent, or Firm—Oblon, Spivak, McClelland, Maier & Neustadt

[57] ABSTRACT

A process of compiling using a vectorized checkup method for converting array calculations appearing in a loop to be vectorized in a source program into vector calculations. The process determines a number of dimensions of an array calculation within a loop and performs a dependence analytical process. The dependence analytical process includes the step (a) of checking the number of dimensions of arrays for the same array variable reference, the step (b) of determining a dependency direction by 1-dimensional processing when it is determined in the step (a) that the arrays are 1-dimensional arrays, the 1-dimensional data dependency analytical step 7a (e, f, g, h) of extracting argument expressions of dimensions of the corresponding arrays when it is determined that the arrays are multiple dimensional arrays, and analyzing a reference dependency relation expressed by the extracted argument expression in units of dimensions, the step (c) of storing information of data dependency relations in units of dimensions obtained by the 1-dimensional data dependency analytical step and information of dependency characteristics according to the number of nests of loop processing to be vectorized, the step (d) of calculating initial dependency directional vectors in correspondence with the number of nests, and the step 7c (i, j, k, l) of combining pieces of information of the data dependency relations associated with the dimensions of the array acquired in the storing step (c) and determining a data dependency relation for all the multiple dimensional arrays.

10 Claims, 3 Drawing Sheets

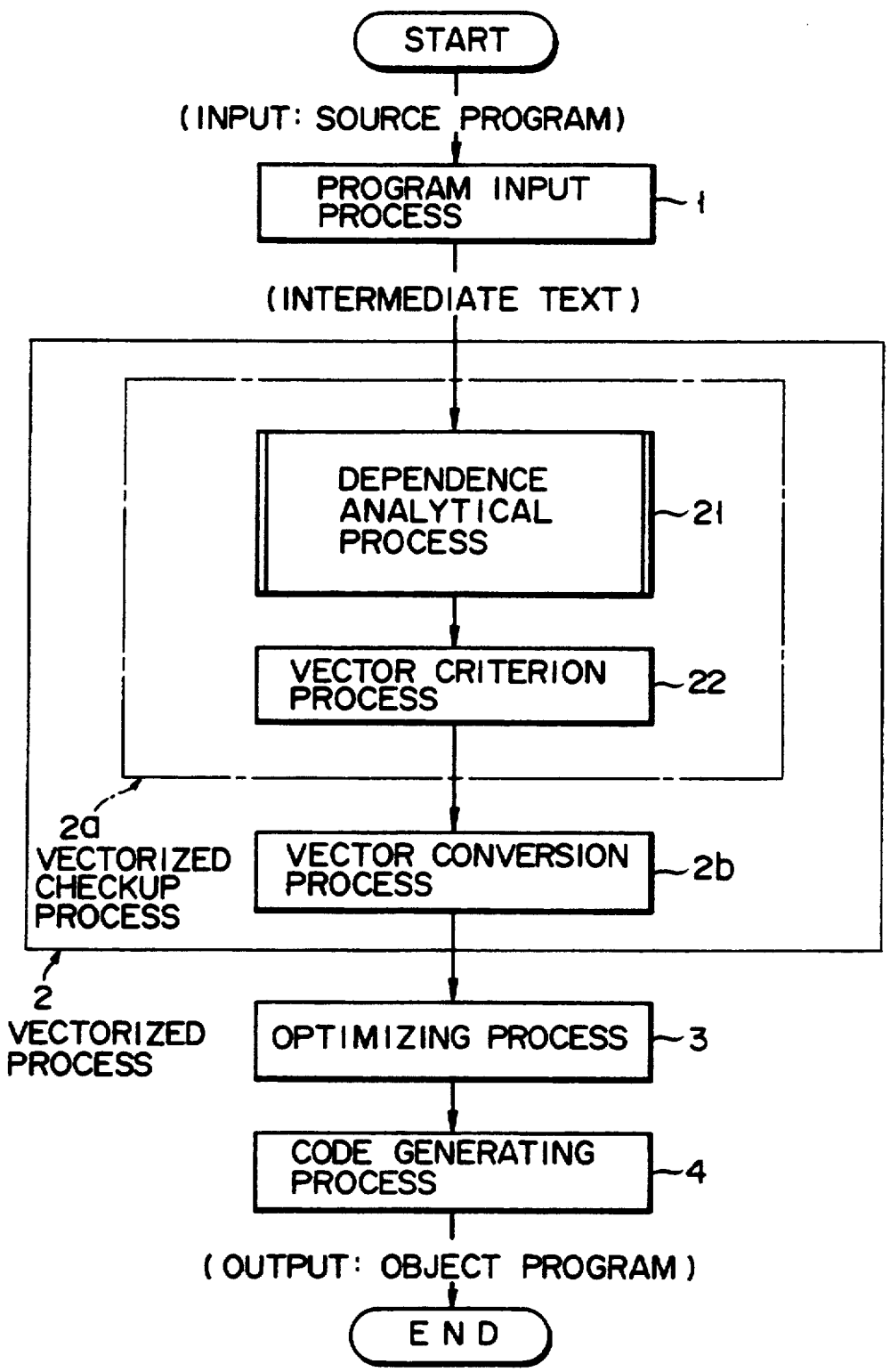
F I G. 1

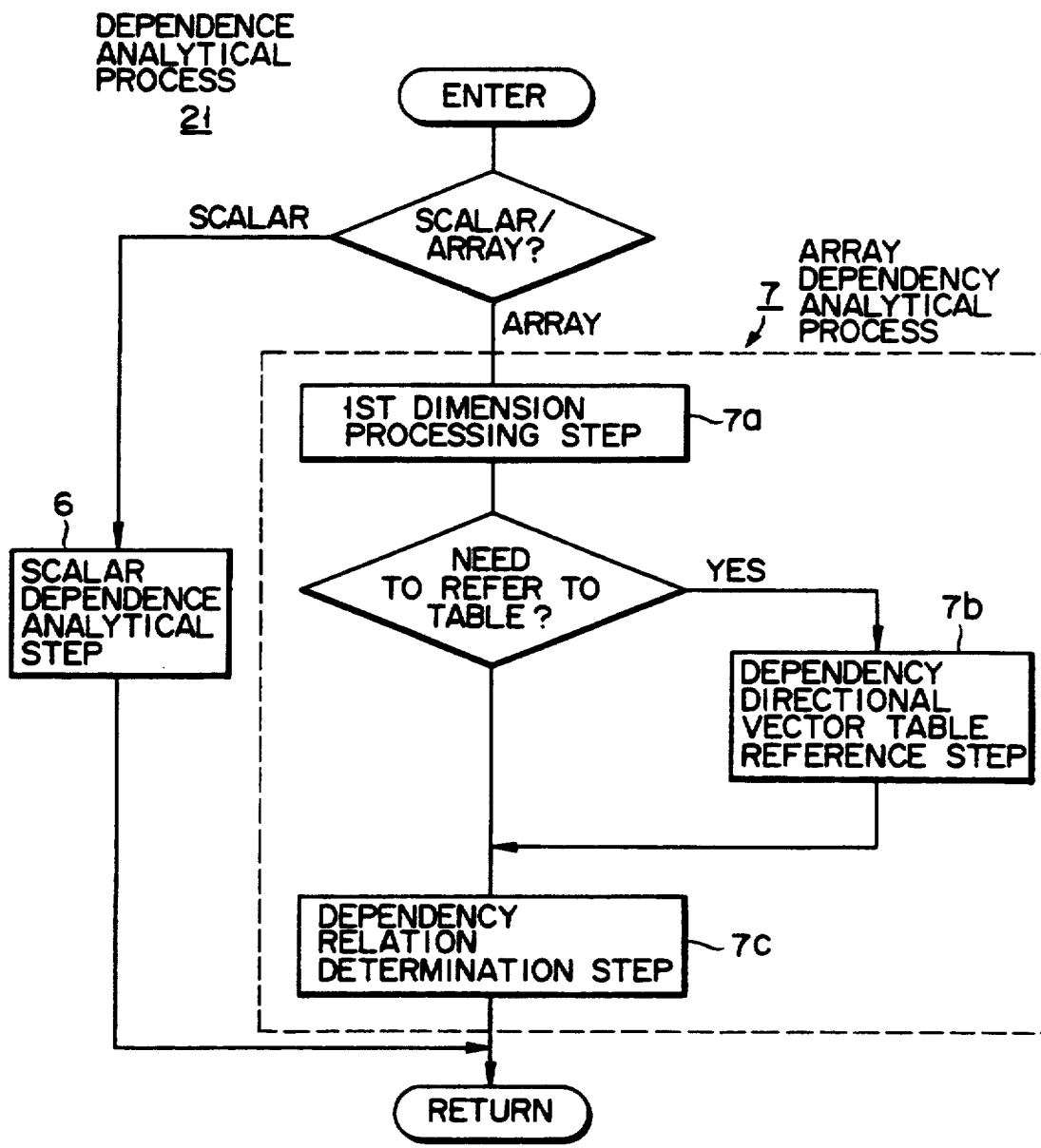
F I G. 2

METHOD OF COMPILING SOURCE CODE INTO VECTORIZED OBJECT CODE BY PERFORMING A ONE-DIMENSIONAL ANALYSIS ON EACH DIMENSION OF A MULTI-DIMENSIONAL ARRAY WITHIN A LOOP

BACKGROUND OF THE INVENTION

1. Field of the Invention

The present invention relates to a compiler having a vector processing function and, more particularly to a vectorized checkup method for converting an array calculation in a loop processing step appearing in a source program into a vector calculation.

2. Description of the Related Art

In a data processing apparatus (computer) having a compiler including a vector processing function, when array calculations which can be vector-processed appear in a loop processing step in a source program upon execution of compile processing of the source program, this step is substituted by a vector calculation instruction (vectorized conversion processing), thereby increasing a vector processing speed.

For example, assume that a source program in the FORTRAN language describes a DO loop processing step having the following condition, i.e., an initial value [1] and an end value [N].

```
<Example 1>   DO 10    I = 1,N
                 A(I) = B(I) + C(I)
              10 CONTINUE
```

These program steps are substituted by the following vector calculations by vectorized conversion processing:

$$IX = (1:N)$$

$$A(IX) = B(IX) + C(IX)$$

The converted program steps as an intermediate text which has already been vectorized as described above are then optimized to generate object codes.

IX in the above equations represents an argument of a vector which changes between the initial value [1] to the end value [N], and is defined as one description element of a vector calculation formula. Therefore, for example, an expression A(IX) means that A(1), A(2), ..., A(N) are vector-processed (simultaneously accessed) in turn for an array A.

According to the program description method described above, the array A need only be accessed according to a change range (1:N) of a control variable included in a DO loop, so that conventional equivalent processing using the DO loop an be easily vectorized.

However, a DO loop appearing in a program in, e.g., the FORTRAN language often has a more complex processing step (program) structure. For example, assume that a DO loop has a program structure including a plurality of (two) statements S1 and S2 as follows:

```
<Example 2>   DO 10 I = 1,N
                 B(I) = A(I) + C(I)        S1
                 E(I) = B(I+1) + D(I)      S2
              10 CONTINUE
```

In <Example 2>, if arrays B in the two statements S1 and S2 in the loop are vectorized (i.e., subjected to expression conversion) according to a dependency relation of their reference orders so that the vector processing can be executed in the order of the statement S1 and the statement S2, a solution different from a designed calculation result of the source program is undesirably obtained. In this case, therefore, the vectorized processing must be performed by replacing the order of statements as follows in consideration of a data reference relation (access order relation) of the two statements S1 and S2.

$$IX = (1:N)$$

$$E(IX) = B(IX+1) + D(IX) \qquad 2$$

$$B(IX) = A(IX) + C(IX) \qquad S1$$

Furthermore, another case wherein a DO loop is given by a program description including two statements S1 and S2 is presented below.

```
<Example 3>   DO 10    I = 1,N
                 B(I) = A(I) + C(I)        S1
                 A(I) = B(I+1) + D(I)      S2
              10 CONTINUE
```

The reference relation between arrays A and B in the two statements S1 and S2 is called "data recursion". Therefore, it is impossible to obtain a solution of a correct vectorized program even if the two statements S1 and S2 are reordered anyway. Therefore, in consideration of the above case, the above input source program portion must be left as a scalar program which retains an original form (the order of steps).

As shown in the program description examples <Examples 1 to 3> of the three DO loops, in order to vectorize DO loop processing steps, the following two preprocessing operations are required:

(Processing 1): Analytical, judgment, and extraction processing for analyzing a data reference relation in a loop, judging to extract only a program portion (a set of statements) which can be vectorized, and leaving a program portion (a set of statements) which cannot be vectorized as a scalar program; and (Processing 2): Reordering processing for appropriately reordering a plurality of statements according to a reference relation among the plurality of statements in order to guarantee correct execution of the vectorized processing.

In general vector calculations by a vector computer, the overall vector elements as calculation objects are simultaneously processed in principle. Therefore, a DO loop (intra-statement processing) which cannot simultaneously process vectors as calculation objects cannot be vectorized (converted) since it is against this principle.

More specifically, in the DO loop shown in <Example 3> described above, the statements S1 and S2 in the loop cannot uniquely determine a dependency relation of the data reference order in the same memory space by limiting it in one direction. That is, a plurality of arrays A and B may have opposite reference (dependency) relations as follows:

$$A: S1 \rightarrow S2, \quad B: S1 \leftarrow S2$$

As a result, since all vectors cannot be simultaneously processed (calculation simultaneity cannot be satisfied), it is impossible to vectorize (convert) program steps while keeping meanings of processing of the source program.

Therefore, in order to vectorize a program description of loop processing, the access order relation of data in the same memory space is checked, and checking results must be systematically judged. More specifically, whether or not the loop is against the above-mentioned "calculation simultaneity" as the basic principle of the vector calculations must be analyzed and judged beforehand. An idea which formulates a data access order relation in the same memory space is called "data dependence", as will be described below.

The "data dependence" includes the following three relations.

(1) "Flow Dependence"

In this dependence, the same memory position is accessed in the order of "definition"→"reference", and two statements S1 and S2 described in a loop have the following relations:

```
S1:     S = ... ...        (definition) ↓
S2:     ... ... = S         (reference) ↓
```

(2) "Anti-dependence"

In anti-dependence, the same memory position is accessed in the order of "reference"→"definition", and two statements S1 and S2 described in a loop have the following relations:

```
S1:     ... ... = S         (reference) ↓
S2:     S = ... ...        (definition) ↓
```

(3) "Output Dependence"

In this dependence, the same memory position is accessed in the order of "reference"→"reference", and two statements S1 and S2 described in a loop have the following relations:

```
S1:     S = ... ...        (reference) ↓
S2:     S = ... ...        (reference) ↓
```

In vectorized processing for a DO loop in a source program, not only the order relation between "reference" and "definition" described above on a program but also data dependence regarding an iteration count associated with a loop index count of loop processing must be checked. For example, the following DO loop is assumed.

```
<Example 4>  DO 10   I = 2,N
                 A(I) = B(I) + C(I)        S1 ↓
                 D(I) = A(I)               S2 ↓
             10 CONTINUE
```

Arrays A have the "flow dependence" in each iteration count of an iteration loop, and do not have data dependence throughout the iteration counts.

However, arrays A in other DO loops shown in the following two examples will be taken into account.

```
<Example 5>  DO 10   I = 2,N
                 A(I) = B(I) + C(I)        S1 ↓
                 D(I) = A(I-1)             S2 ↓
             10 CONTINUE
<Example 6>  DO 10   I = 2,N
                 A(I) = B(I) + C(I)        S1 ↓
                 D(I) = A(I+1)             S2 ↓
             10 CONTINUE
```

In the above examples, the arrays A have the flow dependence in each iteration count of an iteration loop, and further have data dependence throughout the iteration counts. When the "flow dependence" is found from the program of the DO loop, data dependence throughout the iteration counts is checked, and the vectorized processing must be executed while distinguishing these dependence factors of the data dependence from each other. Therefore, Examples 4 and 5 described above are defined as follows:

The relation of the DO loop shown in <Example 4> is defined as "flow dependence having no iteration count dependence".

The relation of the DO loop shown in <Example 5> is defined as "flow dependence depending on the next iteration count".

The relation of the DO loop shown in <Example 6> is defined as "flow dependence depending on the previous iteration count".

The flow dependence has differences, as described above.

Note that data dependence is a relation for defining an execution order when statements in a loop are vectorized. Therefore, when a DO loop is vectorized, data dependence of all the data (scalar variables, 1-dimensional arrays, multiple dimensional arrays, and the like) appearing in the loop must be checked.

As a conventional data dependence analytical scheme associated with 1-dimensional array access in multiple loops, a scheme announced in the reference below is well known.

U. Banerjee;
"Time and Parallel Processor bounds for
Fortran-Like loops" IEEE trans.on Comp.
(Vol.c-28, No. 9, pp-660 to 670 (1979)

The data dependence analytical scheme (method) announced in the above reference analyzes "flow dependence" of a 1-dimensional array A in a DO loop as follows. In particular, statements included in multiple DO loops will be exemplified below.

```
DO i1 = 0,n1
    DO i2 = 0,n2
        ...
        DO im = 0,nm
S1: A(f(i1,i2, ... ,im)) = ... ... ...
S2: ... ... ... = A(g(i1',i2', ... ,im')) END DO
    ...
    END DO
END DO
``` where i1, i2, ..., im in the program description of these loops represent control variables of each loop. Therefore, f and g are linear functions expressed by loop control variables. The following equations express argument functions in the loops of f and g, and are formulated as follows:

$$f(i1,i2, \ldots ,im) = a_0 + \sum_{k=1}^{m} a_k i_k$$

$$g(i1',i2', \ldots ,im') b_0 + \sum_{k=1}^{m} b_k i_k$$

($a_k'$, $b_k'$: integral constants)

Therefore, when kth and subsequent loops are parallelly executed, if statements S1 and S2 have the flow dependence at this level (this will be referred to as dependency of level k, the following conditions are satisfied:

<<Condition 1>>: gcd Test $(b_0 - a_0)$ is divisible by:
$\gcd(a_1 - b_1, a_2 - b_2, \ldots$
$\ldots, a_{k-1} - b_{k-1},$
$a_k, \ldots \ldots a_m, b_k, \ldots \ldots b_m)$ <<Condition 2>>: Banerjee Inequality When $q+ = \max\{q,0\}$ and $q- = \max\{q,0\}$ are defined, coefficients respectively satisfy the following inequality:

$$\alpha \leq \sum_{i=0}^{m} (b_i - a_i) \leq \beta$$

$$\alpha = -b_k - \sum_{i=1}^{k-1} (a_i - b_i) - n_i$$
$$- (a_k^- + b_k) + (n_k - 1)$$
$$- \sum_{i=k+1}^{m} (a_i^- + b_i^+)n_i$$

$$\beta = -b_k + \sum_{i=1}^{k-1} (a_i - b_i) + n_i$$
$$+ (a_k^+ + b_k) + (n_k - 1)$$
$$+ \sum_{i=k+1}^{m} (a_i^+ + b_i^-)n_i$$

In other words, the fact that "statements after the kth loop are parallelly executed" means that statements before the kth loop are sequentially executed. Therefore, the loop control variables of the functions f and g representing the statements S1 and S2 which are executed parallelly satisfy the following relations:

$$i1 = i1', i2 = i2', \ldots, ik - 1 = ik - 1'$$

This fact also implies that when this condition cannot be established, the dependence of the statements S1 and S2 need not be checked since they will never be parallelly executed.

In order to establish the "flow dependence" described above for the kth loop control variable, since the statement S2 must be executed after execution of the statement S1, the following relation is always satisfied:

$$ik \leq ik'$$

Therefore, to summarize the above-mentioned analysis contents, the following relation is established between loop variable vectors (i1, i2, ..., im) and (i1', i2', ..., im') when kth and subsequent loops are parallelly executed.

$$\begin{array}{cccccc} 1 & 2 & & k-1 & k & k+1 & n \\ [=, =, \ldots & \ldots, & =, & \leq, & * & ,\ldots, & *] \end{array}$$

Note that the mark "*" expresses that "the relation is unknown". An expression for expressing the relation among iteration counts of the loops is called a "dependency directional vector". A scheme for analyzing the dependence between the statements S1 and S2 according to the dependency directional vector and making a judgment for vectorized processing is called a "Banerjee's vectorized checkup system".

According to this "Banerjee's vectorized checkup system", dependence of 1-dimensional arrays having any access patterns in a source program can be extracted. However, when multiple dimensional arrays frequently appearing in DO loops are to be processed, the problem is how to extract the dependence.

More specifically, when data dependency analysis for DO loops which process multiple dimensional arrays is performed, the multiple dimensional arrays are normally converted to 1-dimensional images, and the 1-dimensional images are processed. If the multiple dimensional arrays can be converted to 1-dimensional images, data dependency analysis can be performed by directly adopting the "Banerjee's vectorized checkup system" described above.

Assume that the following DO loop is given.

<Example 7>  DIMENSION  A(10,10)
              DO 10  i = 1,N
              DO 10  j = 1,N
        10    A(i,j) = A(j-1,i+1)

Arrays A in the statement No. 10 of the above statements are accessed in the following order:

A (i,j)→A(i+(j−1)*10)→A(i+10*j−10)

A(i−1,j+1)→A(i+1+(j−1−1)*10)→A(i+10*j−19)

Only when the multiple dimensional arrays are converted to 1-dimensional images, as described above, the "Banerjee's vectorized checkup system" can be adopted, and the data dependence of all the multiple dimensional arrays can be checked.

Preprocessing calculations for converting the multiple dimensional array data into 1-dimensional images are very complex and cumbersome. The converted 1-dimensional images require very complex argument expressions. Therefore, a calculation volume for analyzing the data dependence becomes very huge.

Furthermore, in order to develop multiple dimensional array data to 1-dimensional images, size information or size parameters of each dimension must be held for all the multiple dimensional arrays. Therefore, as a compiler of a program, its processing volume is considerably increased.

In the conventional vectorized checkup system described above, when processing statements of multiple dimensional arrays appear in DO loops of a source program, a reference format of each dimension of the multiple dimensional arrays is checked, and this reference format is developed to a format equivalent to 1-dimensional access (1-dimensional image) to perform a checkup operation associated with the data dependence. However, a calculation volume is increased accordingly, and a processing time required for compiling the program is much prolonged.

SUMMARY OF THE INVENTION

It is an object of the present invention to provide a vectorized checkup method which can easily and efficiently analyze a "data dependence or dependency relation" of multiple dimensional arrays without sacrificing an analysis power of a compiler even if statements which must refer to the multiple dimensional arrays appear in a DO loop, and judges to convert the array calculations into vector calculations as needed.

A vectorized checkup method according to the present invention is a data processing method for compiling, i.e., converting an array calculation appearing in a loop of a source program into a vector calculation and executing the vector calculation, wherein in order to perform data dependency analysis associated with multiple dimensional data in the loop, data dependency analysis is independently performed in units of dimensions using an argument of each dimension in the multiple dimensional arrays, and information indicating data dependency relations obtained in units of dimensions are combined to determine a "data dependency relation" for the entire multiple dimensional data reference.

More specifically, (1) The number of dimensions of arrays is checked for the same array variable reference, thereby judging if the arrays are multiple dimensional arrays.

(2) When the arrays are multiple dimensional arrays, an argument expression of each dimension of the multiple dimensional arrays is extracted, and a reference dependency relation is analyzed by a 1-dimensional data dependency analytical method in units of dimensions represented by the argument expressions.

(3) The data dependency relation information for the respective dimensions obtained by the 1-dimensional data dependency analytical method, and dependency characteristic information according to the number of nests of loop processing to be vectorized are acquired and stored.

(4) The pieces of the acquired and stored dependency relation information associated with the dimensions of the multiple dimensional arrays are combined, thereby judging a data dependency relation for the entire multiple dimensional arrays.

The checkup method consisting of the above-mentioned processes checks whether or not array calculations (statements) appearing in a loop can be converted to vector calculations (statements).

According to the vectorized checkup method, a data dependency relation of multiple dimensional array data in an input source program is analyzed in a simple 1-dimensional access format in units of dimensions represented by argument expressions (arguments), and the analyzed data dependency relations of the respective dimensions need only be combined and judged, thereby accurately checking a data dependency relation of the overall multiple dimensional arrays.

More specifically, even when a result of referring to array variables indicates multiple dimensional arrays, data dependency relations of the multiple dimensional arrays can be checked by adopting a conventional data dependency analytical method for 1-dimensional arrays in units of dimensions represented by argument expressions without developing the multiple dimensional arrays into 1-dimensional images. Thereafter, the data dependency relations obtained in units of dimensions represented by the arguments are combined, and a data dependency relation for the entire multiple dimensional arrays is then determined. Therefore, whether or not multiple dimensional arrays in a loop can be vectorized can be efficiently and accurately checked by a simple algorithm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic flow chart of an embodiment of a compiler to which a method of the present invention is applied;

FIG. 2 is a detailed flow chart of a dependence analytical process 21 shown in FIG. 1 (an array dependency analytical process 7 and a scalar dependency analytical process 6)

DETAILED DESCRIPTION OF THE PREFERRED EMBODIMENT

Figure 3:
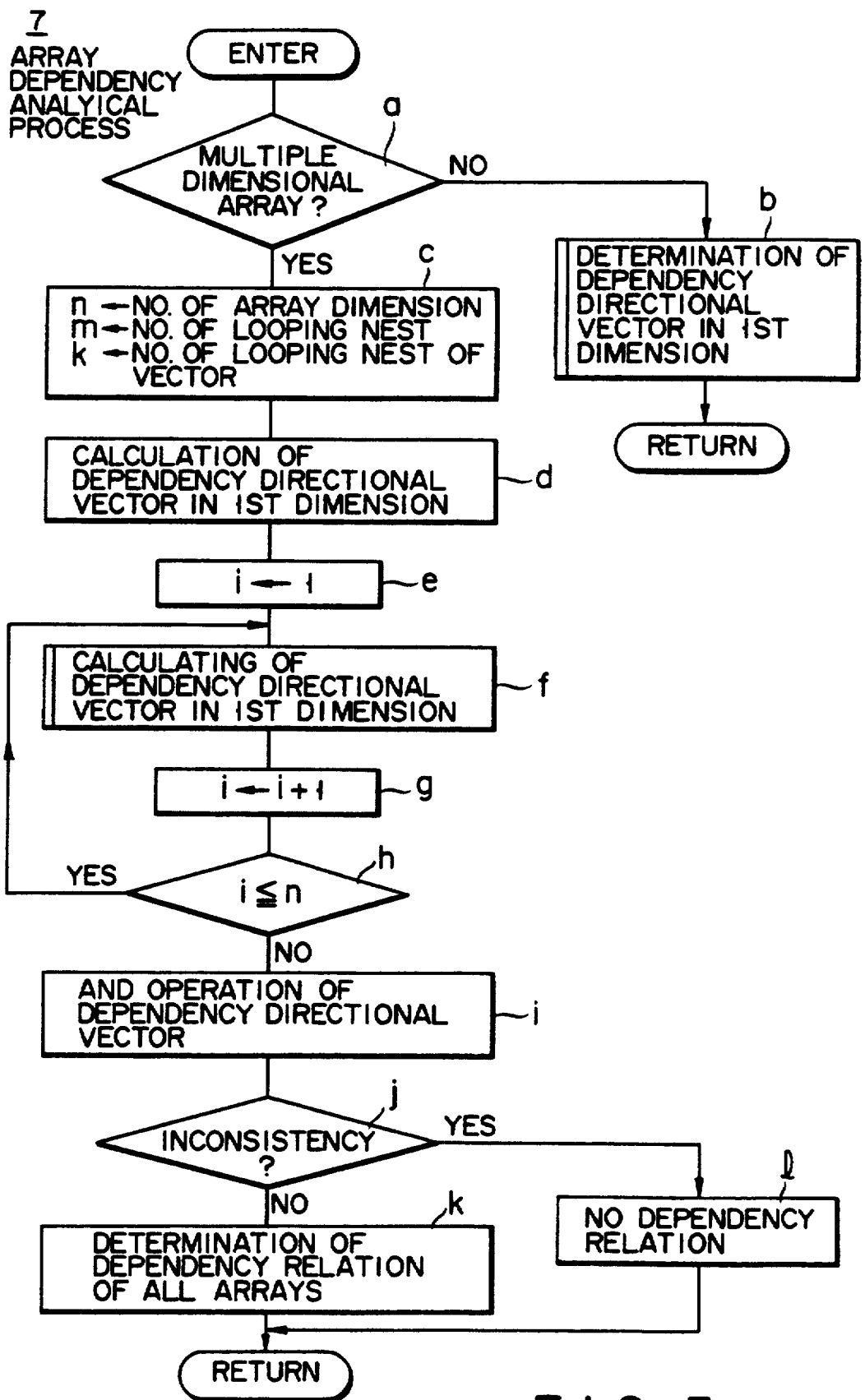
FIG. 3 is a detailed flow chart showing an dependency direction analytical process for multiple dimensional arrays in the array dependency analytical process 7.

As shown in FIG. 1, a compiler to which a vectorized checkup method of the present invention is applied comprises the following processes. More specifically, this compiler mainly comprises a program input process 1, a vectorized process 2, an optimizing process 3, and a code generating process 4. A source program input to this compiler is converted to an object program including vector calculations, and a program which can be executed is output.

The program input process 1 has a function of reading an input source program, executing predetermined processing such as syntax check, and converting the source program into an intermediate text. The intermediate text converted and generated by the program input process 1 is supplied to the vectorized process 2 as the next step.

The vectorized process 2 includes a vectorized checkup process 2a and a vector conversion process 2b. The vectorized checkup process 2a analyzes a data dependency relation in the program on the basis of the intermediate text supplied from the program input process 1, and checks whether or not the program can be vectorized. The vector conversion process 2b converts the program which is determined by the vectorized checkup process 2a to be able to be vectorized into a vector format. Furthermore, the vector conversion process 2b determines an execution order of vectorized processing according to the analysis result of the data dependency relations, thereby reordering the intermediate text.

The intermediate text which is subjected to the vectorized checkup processing in the vectorized process 2 is supplied to the next optimizing process 3, and is then supplied to the code generation process 4. As a result, the intermediate text is converted to an object code program which is optimal to a processor which executes this program.

The vectorized checkup process 2a comprises a dependence analytical process 21 for analyzing a data dependency relation in a source program, and a vector criterion process 22 as a conventional method of determining whether or not a program can be vectorized, and determining an execution order of calculations upon vectorization. Data to be processed in the dependence analytical process 21 are statement data which are subjected to a plurality of "definitions" (setup of values) and a plurality of "references" (reference of values) in for executing analytical processing of the array variables.

The scalar dependency analytical process 6 has a function of analyzing a dependency relation based on, e.g., appearance orders of arrays in a program, and determining a dependency relation of scalar statements. Therefore, this process 6 can be relatively easily realized by a conventional algorithm.

In contrast to this, as shown in detail in FIG. 2, the array dependency analytical process 7, as the characteristic feature of the present invention, mainly comprises a 1st. dimension processing step (e.g., 1-dimensional data dependency analytical step) 7a, a dependency directional vector table reference step 7b, and a dependency relation determination step 7c. FIG. 3 is a flow chart showing a processing sequence of the analytical process 7. Analytical processing for array variables are executed according to this routine (processing steps), as will be described in detail later.

Processing for vectorized checkup as the characteristic feature of the present invention, i.e., the flow of analytical processing for array variables appearing in a loop, in the array dependency analytical process 7 will be described below with reference to FIGS. 1 to 3.

A source program is loaded by the input process 1. The input program is converted into an intermediate text having a format which facilitates processing of the process 2, and the intermediate text is supplied to the vectorized process 2.

At the entrance of the vectorized process 2, the intermediate text is supplied to both the scalar dependency analytical process 6 and the array dependency analytical process 7. The vectorized process 2 executes a series of steps according to a predetermined processing algorithm in the corresponding processes to be described below.

In the array dependency analytical process 7, whether arrays appearing in DO loops of the program input as the intermediate text are 1-dimensional arrays or multiple dimensional arrays is checked (step a).

This checking step can be achieved by checking the number of dimensions of the arrays to be processed. More specifically, when the arrays to be processed are 1-dimensional arrays, an argument on the intermediate text is extracted in the 1st. dimension processing step 7a in the array dependency analytical process 7, and the 1-dimensional analytical processing is executed according to the extracted argument. The 1-dimensional analytical processing in the 1st. dimension processing step 7a is realized by using, e.g., a data dependency analytical method adopting the above-mentioned "Banerjee's checkup system" (step b).

With this analytical processing, data dependency relations (dependency direction information) of the 1-dimensional array data are obtained.

In contrast to this, if it is determined that the arrays to be processed are multiple dimensional arrays, argument expressions of the arrays are extracted, and 1-dimensional analytical processing is independently executed in units of dimensions represented by the argument expressions in the 1st. dimension processing step 7a.

More specifically, when the number of array dimensions is n, 1-dimensional analytical processing is repetitively executed n times for n dimensions expressed by the argument expressions, and data dependency relations are obtained in units of dimensions. The data dependency relations are sequentially registered in a dependency directional vector table. Thereafter, this table is referred as needed in the dependency directional vector table reference step 7b.

When the dependency directional vector table reference step 7b executes analytical processing for n-dimensional arrays in m loops, it is realized as a table having a length m for storing dependency directional vector information, and having (n+1) memory areas.

Each element of the dependency directional vector information obtained by the 1-dimensional analytical processing for arrays is expressed by, e.g., the following 3-bit information according to the data dependency between statements S1 and S2 in the loop:

$>$ : [100], $=$ : [010], $<$ : [001]
$\geq$ : [110], $\leq$ : [011], * : [111]

(where the mark "*" represents dependency in all the directions)

The dependency directional vector information is obtained for each dimension expressed by the argument expression, and is sequentially registered in the dependency directional vector table.

The data dependence analytical processing for the multiple dimensional arrays will be described in detail below. More specifically, if it is determined that arrays to be processed are multiple dimensional arrays, the number n of dimensions of the arrays is obtained, and the number m of looping nests (multiplexing degree), and the number k of looping nests of a vector are respectively obtained (step c).

Thereafter, an initial dependency directional (1st. dimension) vector for the number k of looping nests of the vector is calculated, and is registered in the dependency directional vector table 7b (step d).

The initial dependency directional vector for the number k of looping nests of the vector registered in the dependency directional vector table is given in the order of the following formula:

$$\begin{array}{cccccc} 1 & 2 & & k-1 & k & k+1 & m \\ [=, & =, & \ldots & \ldots, & =, & *, & * & , \ldots, & *] \end{array}$$

The initial dependency directional vector initialized in the process is used in processing for vectorizing a kth level in the m loops. More specifically, when k levels are to be vectorized, a dependency directional vector in which (k−1) pieces of depend directional vector information [=] are aligned and pieces of dependency vector information [*] are aligned in correspondence with kth to mth levels are set as the initial dependency directional vector.

In this manner, this vector is set assuming that the kth loop is vectorized, and 1st to (k−1)th loops are sequentially executed. Therefore, loop variables of these loops are always equal to each other, and for their dependency directions, the dependency directional vector information [=] need only be checked. Since such an initial dependency directional vector is set, redundant calculations except for a loop level to be vectorized can be effectively omitted.

For the arrays to be processed in each dimension expressed by the argument expression, dependency direction vector calculation processing by 1-dimensional analytical processing is started while a control parameter i for sequentially designating the argument expressions is initially set to be [1] (step e).

In the 1st. dimension processing step 7a, the dependency directional vector of k levels for an ith dimension is calculated, and the calculated dependency directional vector is registered in the dependency directional vector table (step f).

Immediately after this processing, the control parameter i is incremented by one (step g).

It is monitored if the value of the control parameter i reaches the number n of array dimensions. During this interval, the calculation processing in step f is repetitively executed, thereby independently executing 1-dimensional analytical processing in units of dimensions (step h).

As a result, a total of (n+1) dependency directional vectors, i.e., the dependency directional vectors independently obtained in units of array dimensions and the above-mentioned initial dependency directional vector are entered in the dependency directional vector table.

In the dependency relation determination step 7c is the array dependency analytical process 7, the data dependency relation of all the multiple dimensional arrays to be processed is determined on the basis of the dependency directional vectors retrieved in the dependency directional vector table reference step 7b for referring to the dependency directional vectors obtained in units of dimensions and acquired in the dependency directional vector table.

The basic algorithm of processing steps of the vector criterion process 22 is as follows. That is, if dependency directions of all the dimensions of array data have no "inconsistency", it can be said that "the dependency relation of the arrays is established". Contrary to this, if the dependency directions have inconsistency, it can be said that "no data dependency relation is established in the arrays".

Whether or not "inconsistency" is present in the dependency relation will be considered below. For example, assume that dependency directional vectors of dependency relations in respective dimensions of 2-dimensional arrays appearing in double loops are expressed as follows:

$$[=, =], [=, \leq]$$

In either dimension, the dependency relation is established for (=, =), and hence, there is no "inconsistency" between these relations.

On the other hand, assume that dependency directional vectors of dependency relations in respective dimensions of 2-dimensional arrays appearing in double loops are expressed as follows:

$$[=, <], [=, >]$$

In this case, since there s no dependency directional vector which matches with these dependency relations, it can be derived that these relations have "inconsistency". Therefore, if there is "inconsistency", it can be concluded that "there is no dependency relation for all arrays".

The dependency relation determination process 7c performs an AND operation of the dependency relation of the overall multiple dimensional arrays according to the above judgment standard, i.e., logically ANDs information of dependency directional vectors given by the above-mentioned 3-bit information in units of bits (step i).

When vector elements which yield all bits="0"s are obtained, it is judged that the dependency relation has "inconsistency" (step j).

More specifically, when two dependency directional vectors are given by:

$$[=, <], [=, \leq]$$

if these directional vectors are expressed by the above 3-bit information, we have:

$$[010, 001], [010, 011]$$

AND products of these vectors in units of bits are [010, 001], and it is determined that the dependency relation $[=, <]$ is established between these vectors.

In contrast to the above case, assume that the two dependency directional vectors are given as follows:

$$[=, <], [=, >]$$

In this case, if these directional vectors are expressed by the above 3-bit information, they can be expressed by:

$$[010, 001], [010, 100]$$

AND products of these vectors in units of bits are expressed by [010, 000], and one of bit elements becomes [0]. Therefore, it can be determined that "no dependency relation is established" between two arrays.

The dependency relation determination process 7c sequentially repeats "inconsistency" judgment processing of the dependency directional vectors, thereby judging the data dependency relation for all arrays. When a bit element which yields [0]is detected, it is checked if the dependency relation has "inconsistency" (step j). If "inconsistency" is found, it is judged that "there is no dependency relation" (step l).

If none of bits which become [0]in three bit elements can be found, it is judged that "there is a dependency relation". In step k, the dependency relation of all the arrays is determined. More specifically, the dependency directional vectors are searched from the first loop (from the left side of the dependency relation expression [11]), and under the assumption that dependency directional vector information is not [=], it is determined that another dependency directional vector information appearing first represents the dependency direction of all the arrays (step k).

Note that if all the dependency directional vector information are [=], it is determined that all the arrays have the dependency relation in a [=] direction.

Upon execution of the above-mentioned judgment processing, when [0]is detected in three bit elements it can be concluded that "there is no dependency relation". Therefore, execution of the following processing steps can be omitted. With the above-mentioned checkup method, wasteful processing steps can be omitted unlike in the prior art, and compile processing efficiency can be improved.

Some examples of the dependency analytical method for multiple dimensional arrays in the array dependency analytical process 7 will be explained below. Note that codes representing the dependency relation are defined as follows:

[−] is a code meaning "don't care",

[?] is a code representing inconsistency,

[Init DV] is a code representing initial dependency directional vector,

[DV 1] is a code representing a dependency directional vector of the 1st dimension,

[DV 2] is a code representing a dependency directional vector of the 2nd dimension, and

[res DV] is a code representing a dependency directional vector of AND products.

A description will be made using the above expressions.

Assume that a program description in the FORTRAN language, which forms DO loops, is given.

```
<Example 8>      DO  i = 1,n1
                    DO  j = 1,n2
           S1:        A(i+2*j,j) = ... ...
           S2:        ... ... = A(i+j,j)
                    END DO
                 END DO
```

When the above loops are vectorized by an i loop (DO loops controlled by the i counter), the dependency relation between arrays A in two statements S1 and S2 is determined as follows:

```
init DV = [*, *]
DV 1 = [*, *]
DV 2 = [-, =]
res DV = [*, =]
```

Therefore, in this case, it is determined that "the dependency relation in an [*] direction exists" for all the arrays.

When the above-mentioned loops are vectorized by a j loop (DO loops controlled by the j the dependency relation of the arrays A is determined as follows:

```
init DV = [=, *]
DV 1 = [=, <]
DV 2 = [-, =]
res DV = [*, ?]
```

Therefore, in this case, since it is detected that "there is inconsistency in that dependency direction", it is concluded that "there is no dependency" for all the arrays A.

In contrast to the above case, assume that a program description forming the following DO loops is given:

```
<Example 9>      DO  i = 1,n1
                    DO  j = 1,n2
           S1:        A(2*i+1,j) = ... ...
           S2:        ... ... = A(i+3,j)
                    END DO
                 END DO
```

In this case, when the above loops are vectorized by an i loop, the dependency relation between arrays A in two statements S1 and S2 is determined as follows:

```
init DV = [*, *]
DV 1 = [≧, *]
DV 2 = [-, =]
res DV = [≧, =]
```

Therefore, in this case, it is determined that "the dependency relation in a [≧] direction exists" for all the arrays.

When the above loops are vectorized by a j loop, the dependency relation is expressed by:

```
init DV = [=, *]
DV 1 = [=, -]
DV 2 = [-, =]
res DV = [=, =]
```

Therefore, in this case, it is concluded that "there is a dependency in a [=] direction" for all the arrays.

Furthermore, assume that a program description forming the following DO loops is given:

```
<Example 10>     DO  i = 1,n1
                    DO  j = 1,n2
           S1:        A(i,i) = ... ...
           S2:        ... ... = A(i+1,i-2)
                    END DO
                 END DO
```

In this case, when the above loops are vectorized by an i loop, the dependency relation between arrays A in two statements S1 and S2 is determined as follows:

```
init DV = [*, *]
DV 1 = [>, *]
DV 2 = [<, -]
res DV = [?, -]
```

Therefore, in this case, it is determined that "there is inconsistency in dependency directions", and hence, it is determined that "there is no dependency relation for all the arrays at all". Like in this example, when it is determined that "there is no dependency relation in an outer loop" of double DO loops, it is obvious that "there is no dependency relation in an inner loop (in this case, the j loop)".

As can be apparent from the examples described above, the method of the present invention is a vectorized checkup method which executes dependency relation analysis of dimensions by adopting a conventional 1-dimensional analytical method (e.g., "Banerjee's checkup system") even when multiple dimensional arrays are to be processed. More specifically, 1-dimensional analysis is performed in units of dimensions using a simple argument representing each dimension of multiple dimensional arrays, thereby independently checking its dependency direction (dependency direction vector). Therefore, processing for developing multiple dimensional arrays into 1-dimensional images is not required unlike in the conventional method, and a calculation volume can be reduced, thus greatly shortening a processing time. In addition, the dependency relation of all the arrays can be expressed by a simple AND operation (logical product calculation) on the basis of the dependency directional vectors calculated for each dimension. Therefore, a processing algorithm can be simplified as compared to a conventional method, and a processing time can be further shortened.

The method of the present invention can cope with DO loops having arbitrarily multiple nests or arrays of arbitrarily multiple dimensions without changing an original processing algorithm, and a vectorized checkup operation can be accurately and efficiently performed. Furthermore, the method of the present has good extensibility.

The present invention is not limited to the above embodiment, and various changes and modifications may be made within the spirit and scope of the invention. For example, a kind of language of an input source program is not particularly limited.

As a 1-dimensional analytical processing method for analyzing a dependency relation of arrays, various other checkup systems may be employed in addition to the above-mentioned "Banerjee's checkup system".

As described above, according to the present invention, a vectorized checkup operation for multiple dimensional arrays can be performed such that after dependency of each array is checked in units of dimensions expressed by arguments, the dependency of all the arrays is obtained. Therefore, a calculation volume required for the vectorized checkup operation can be greatly reduced, and an accurate checkup result can be easily and efficiently obtained at high speed.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A compiling process which uses a vectorized checkup method for converting an array calculation appearing in a loop to be vectorized into a vector calculation, comprising the computer implemented steps of:
   receiving an input source program having an array calculation appearing in a loop;
   determining, by a first determining step, if said array calculation in the loop of the received input source program includes a one-dimensional array calculation or a multi-dimensional array calculation having a plurality of dimensions;
   performing a first analytical processing by performing a one-dimensional dependency analysis on said array calculation in the loop of the received input source program to determine first data dependency relationships, when said first determining step determines that said array calculation includes a one-dimensional array;
   performing a second analytical processing by performing a one-dimensional dependency analysis on each of said dimensions of the multi-dimensional array of the loop, using an argument of each of said dimensions, to determine a plurality of second data dependency relationships corresponding to a number of said plurality of dimensions, when said first determining step determines that said array calculation includes a multi-dimensional array;
   registering the second data dependency relationships in a table, when said first determining step determines that said array calculation includes a multi-dimensional array;
   determining, by a second determining step, third dependency relationships between said multiple dimensions of said array calculation using said second data dependency relationships registered in said table, when said first determining step determines that said array calculation includes a multi-dimensional array; and
   compiling said input received source program into object code, using said first dependency relationships when said first determining step determines that said array calculation includes a one-dimensional array, and using said third dependency relationships when said first determining step determines that said array calculations include a multi-dimensional array.

2. A method according to claim 1, wherein said first analytical processing is performed by a "Banerjee's checkup method."

3. A method according to claim 1, wherein said second analytical processing repetitively performs, when a number of array dimensions is n, one-dimensional analytical processing n times, to obtain the second data dependency relations, and the registering step registers sequentially, the second data dependency relations in a vector table.

4. A method according to claim 1, wherein said first determining step is performed by checking a number of dimensions of said array calculation.

5. A method according to claim 4, wherein the step of receiving an input source program receives an input source program in which the loop is a DO loop appearing in a program in a computer language.

6. A method according to claim 1, wherein the dependency analysis steps of the first and second analytical processing steps express the determined data dependency relationships using three bits.

7. A method according to claim 6, wherein the dependency analysis steps of the first and second analytical processing steps express the determined data dependency relationships as follows:

$>$: [100], $=$: [010], $<$: [001]
$\geq$: [110], $\leq$: [011], $*$: [111].

8. A method according to claim 1, wherein said second determining step includes a step of checking if there is an inconsistency between the data dependency relations.

9. A method according to claim 8, wherein said step of checking if there if an inconsistency, is performed by logically multiplying the data dependency relationships.

10. A method according to claim 9, wherein the dependency analysis steps of the first and second analytical processing steps express the determined data dependency relationships as follows:

$>$: [100], $=$: [010], $<$: [001]
$\geq$: [110], $\leq$: [011], $*$: [111].

* * * * *